May 22, 1962  A. W. JOHNSON  3,035,513
FEED BLOCK PRESS

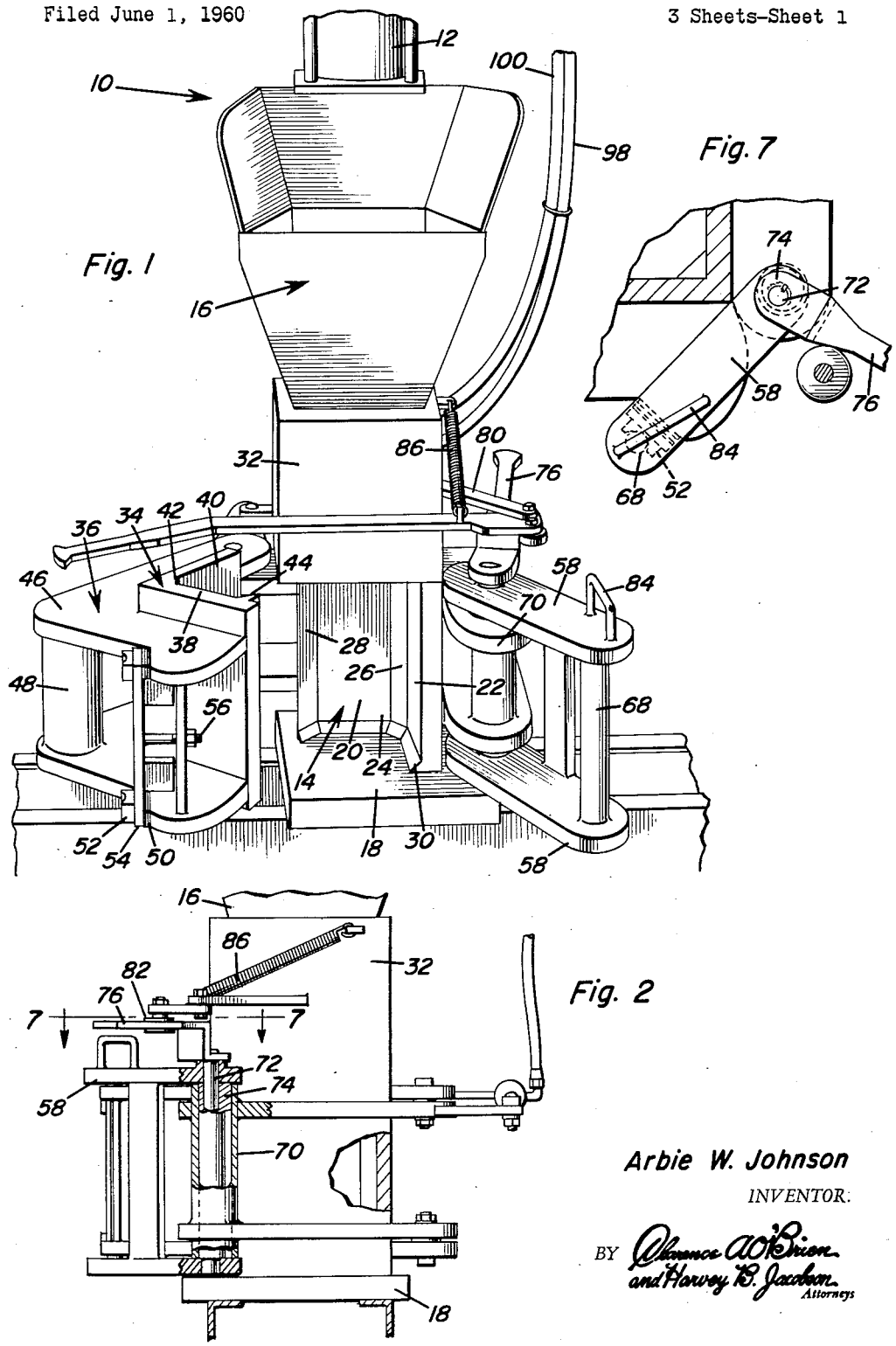

Filed June 1, 1960  3 Sheets-Sheet 2

Arbie W. Johnson
INVENTOR.

BY Clarence A. O'Brien
and Harvey B. Jacobson
Attorneys

May 22, 1962     A. W. JOHNSON     3,035,513
FEED BLOCK PRESS
Filed June 1, 1960     3 Sheets-Sheet 3
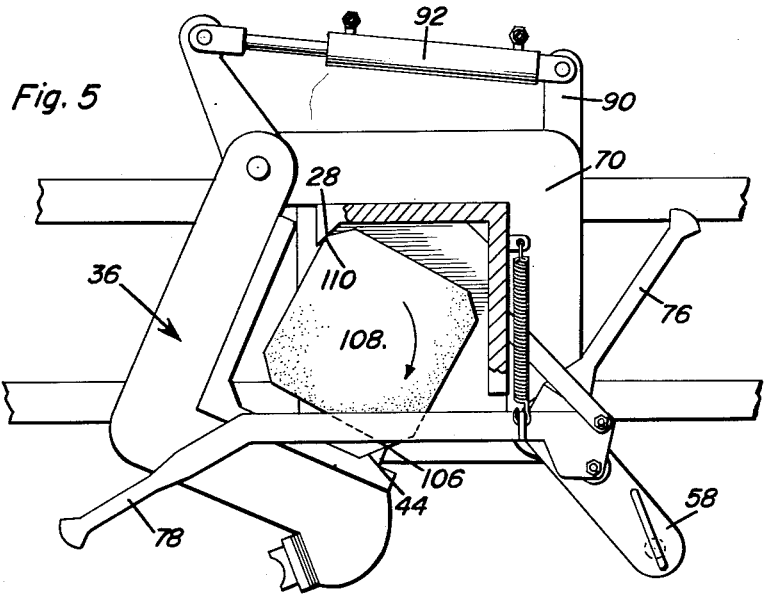
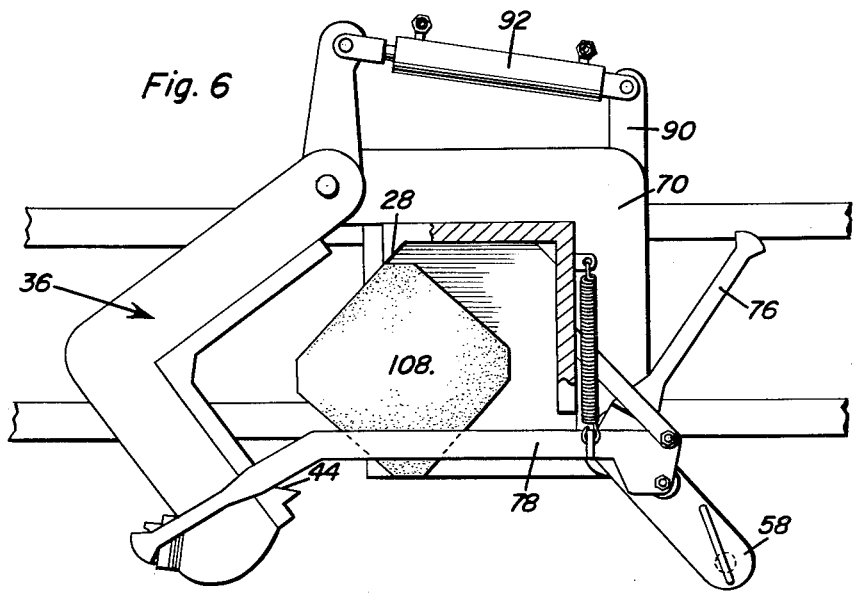
Arbie W. Johnson
INVENTOR.
BY *Clarence A. O'Brien*
and *Harvey B. Jacobson*
Attorneys

United States Patent Office 3,035,513
Patented May 22, 1962

3,035,513
FEED BLOCK PRESS
Arbie W. Johnson, Elgin, Tex., assignor to A. E. Johnson & Sons, Inc., Elgin, Tex., a corporation of Texas
Filed June 1, 1960, Ser. No. 33,172
15 Claims. (Cl. 100—218)

This invention relates to a block forming press for material such as mineral or protein feed matter that is to be compressed into forms for transport and storage purposes.

It is therefore a primary object of this invention to provide a block forming mold for use in the press which will form a well proportioned block and which is both simple to operate and economical to manufacture.

Another object of this invention in accordance with the foregoing object, is to provide a mold for a feed block forming press that may be opened for easy removal of the block formed by the press in the mold.

An additional object of this invention in accordance with the foregoing objects, is to provide a feed block press mold that will upon being opened spin the block formed therein away from the die surfaces of the mold without damage to the sides of the block enabling easy removal of the block from the mold.

In accordance with the foregoing objects, the mold in accordance with this invention is formed by a stationary die including two block side forming surfaces being interconnected with a chamfered side face for forming beveled edges on the block. Also the stationary die includes a chamfer face forming surface connected to the open edge of one of the block side forming surfaces. The mold is completed by a door portion pivoted to the stationary portion, said door portion mounting a complementary die including the block side forming surfaces and chamfer edge faces complementary to the stationary die surface and faces. The above arrangement is such that the door portion when opened after a block has been formed within the mold, will engage by the outer chamfer face on the die, an edge of the block formed in the mold to thereby spin the block away from the surfaces of the stationary die so that the block may be easily removed from the mold without damage or clinging of material to the die surfaces. The mold also features a selectively releasable, adjustable pressure lock mechanism for holding the door of the mold closed with the requisite pressure.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of a feed block forming press including the novel mold in accordance with this invention.

FIGURE 2 is a partial side view with parts shown in section of the press in accordance with this invention.

FIGURE 5 is a top sectional view showing the mold being opened and spinning the block formed therein away and out of the mold.

FIGURE 6 is a top sectional view of the mold in completely opened position with the block formed therein ready to be removed.

FIGURE 7 is a sectional view taken through a plane indicated by section line 7—7 in FIGURE 2.

Figure 3:
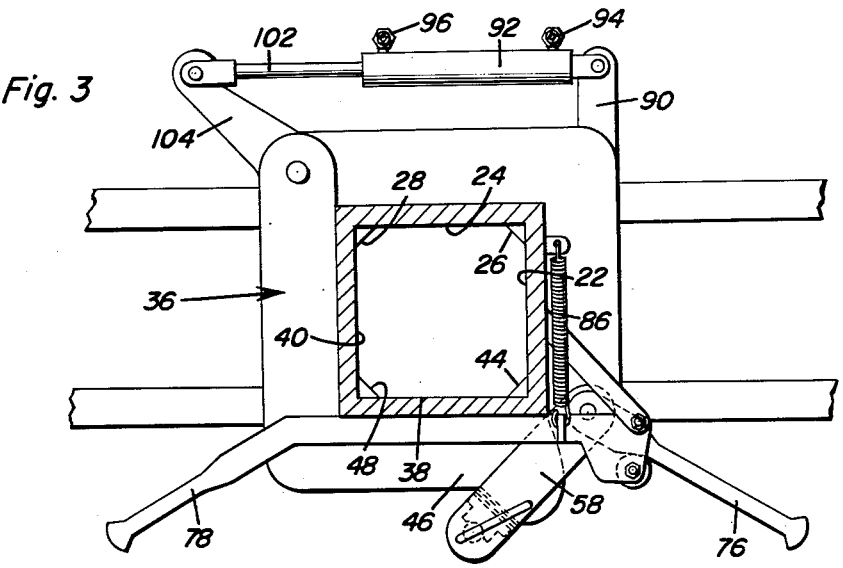
FIGURE 3 is a top sectional view showing the mold in a pressure locked casting condition.

Referring to the drawing in detail, FIGURE 1 illustrates the press generally indicated by reference numeral 10. The press includes a ram 12 provided for the purpose of compressing the material into the mold generally indicated by reference numeral 14 shown in open position in FIGURE 1. The press also includes a feed hopper 16 within which the material to be compressed is loaded for deposit into the mold 14.

As seen in FIGURE 1, the mold is formed by a bottom block 18 upon which there is mounted a stationary die generally indicated by reference numeral 20. The die 20 includes block side forming surfaces 22 and 24 which are interconnected by a chamfer edge face forming surface 26. A second chamfer face forming surface 28 is connected to the other side of block side forming surface 24, said face forming surface 28 constituting one of the block spinning control faces as will be hereafter explained. A chamfer edge surface 30 is also provided along the bottom portion of all of the surfaces and edges of the stationary die 20. Mounted on top of the die 20 is the material inlet block 32 on which the feed hopper 16 is mounted.

A die generally referred to by reference numeral 34 similar to die 20 is mounted on a mold door portion generally indicated by reference numeral 36. The die 34 also includes block side forming surfaces 38 and 40 interconnected by a chamfer edge forming face 42 and a chamfer face 44 also constituting the block spinning face. The chamfer surface 42 also constitutes a block spinning control surface as hereafter explained.

The die door portion 36 includes a pair of spaced die door backing members 46 interconnected by spacing member 48, said backing members 46 mounting a plate member 54 on which a pair of cradle members 52 are mounted in spaced relation thereto the spacing being adjustable by insertion of shims 50. The mounting member 54 for the cradles 52 are thereby adjustably spaced relative to the backing members 46 by means of adjustable screw 56 as seen in FIGURE 1.

A locking mechanism for holding the door portion 36 in closed or locked position as illustrated in FIGURE 3, is provided and includes a pair of locking arms 58 which are spaced apart by means of member 68 which is receivable within the cradle members 52 as shown by dotted line in FIGURES 3 and 7 to thereby lock the door portion 36 in position. The lock arms 58 are pivotally mounted on a backing portion 70 connected to the stationary die 14, by means of a pivot pin 72 rotatably mounted within the stationary backing portions 70 by means of a rotatable shaft 74 shown in dotted line in FIGURE 7, the pivot pin 72 being eccentrically disposed relative to the shaft member 74. The pivot pin 72 is fixedly connected to a pressure lock arm handle 76 so that rotational movement of the lock arm handle 76 will rotate shaft member 74 disposed eccentrically with respect thereto. Accordingly, the position of the pivot pin 72 on the stationary backing member 70 may be varied to thereby lock or release the member 68 when it is in alignment with the cradle members 52 as seen in FIGURES 3 and 7. It will therefore be apparent that by clockwise movement of the lock arm handle 76, the member 68 will be moved into pressure engagement with the cradle members 52 while counterclockwise movement of the lock arm handle 76 would release the member 68. A pressure regulating lock release lever 78 is therefore provided and is pivotally connected to a mounting arm 80 extending from the side of the block 32. A release roller 82 is provided on the lock release lever and is engageable upon counterclockwise rotation, with the lock arm handle 76 to relieve pressure engagement with the cradle members 52 as will be apparent from FIGURE 4. A handle 84 is provided on the top of lock arm 58 in order to move the lock arm into alignment with the cradle members 52. It will also be observed that a spring 86 is provided and connected to the lock release lever 78 by means of ear 88 in order to hold the lever 78 in retracted position against the inlet block 32. It will be apparent that the lock release lever 78 serves a twofold purpose, firstly to position the roller 82 as illustrated in FIGURE 3 when the lever 78 is in retracted position, so as to limit movement of the lock arm handle 76 to the position of maximum locking pressure, and secondly, to provide a large mechanical advantage or leverage for unlocking the lock arm handle 76.

Figure 4:
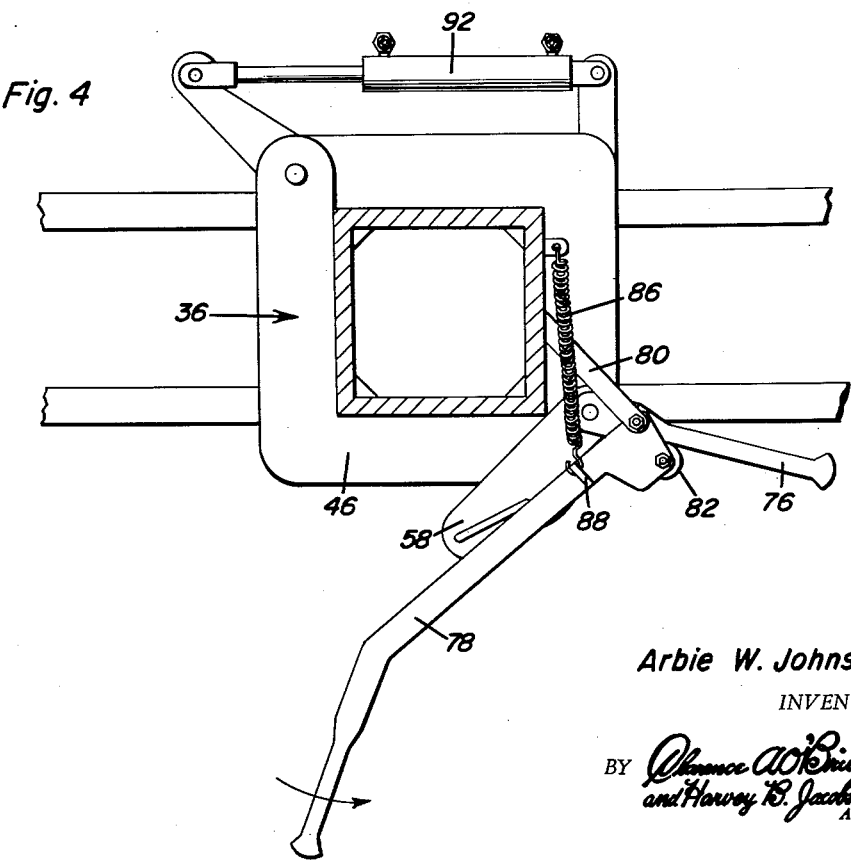
FIGURE 4 is a top sectional view showing the mold in unlocked condition.

Attached to the rear of the mold 14 is a mounting lug 90 as seen in FIGURES 3 through 6 upon which a fluid cylinder 92 is pivotally mounted having a pair of fluid conduit fittings 94 and 96 to which the conduits 98 and 100 are connected for conducting fluid under pressure to the cylinder 92 to extend or retract piston rod 102 which is pivotally connected to the die door portion 36 by means of arm 104. Accordingly, hydraulic power means is provided for swinging the die door 36 open or closed. In FIGURES 5 and 6 the power cylinder 92 is shown opening the door 36. In FIGURES 3 and 4 the power cylinder is in its extended condition wherein the door is closed. Operation of the feed block press is as follows. The feed material is deposited into the hopper 16 and fills up the mold 14 after the door 36 has been closed and maintained closed under pressure by means of lock arms 58 engaging the cradle members 52 by means of member 68 with the lock arm handle 76 having been rotated to its clockwise position against roller 82 on lever 78 as shown in FIGURE 3 whereby the pivot pin 72 has rotated the shaft member 74 toward the position shown in FIGURE 7 wherein the pivot axis thereof about which the lock arms 58 are rotatable, draws the shaft member 68 on the lock arms 58 against the cradle members 52 with the requisite pressure. The actual locking pressure may be adjusted by inserting shim stock 50 between the cradle 52 and the die door backing 46. The hydraulic ram 12 then comes down into the mold and compresses the feed material therein. Accordingly, a block is formed the sides of which are defined by the die surfaces 22, 26, 24, 28, 40, 42 and 38 as seen in FIGURE 3. After the block has been so formed, the release lever 78 is actuated as shown in FIGURE 4 while the ram is being elevated to engage the lock handle 76 to facilitate release of the lock arm member 68 from engagement with the cradle members of the door backing member 46. The hydraulic cylinder 92 is subsequently operated to open the die door 36 as seen in FIGURE 5. It will be observed in FIGURE 5 that as the door 36 is swung open the chamfer edge forming face 44 on the die door slidably and frictionally engages the edge 106 of block 108 to cause pivoting thereof about a fulcrum edge 110 in engagement with the face 28 on the stationary die to thereby displace or spin the block in a clockwise direction away from the surfaces of the mold as will be apparent in FIGURES 5 and 6.

It will therefore be appreciated that by virtue of the novel mold construction made in accordance with this invention a well proportioned feed block is formed including beveled edges which cooperate with the bevel forming faces on the mold dies to cause the feed block to spin away from the mold die surfaces as the mold door is swung open so that the block may be easily removed from the mold. It will also be appreciated that as a result of the above novel removal action the block may be readily removed intact from a mold mechanism that is both simple to operate and involves a minimum of parts for accomplishing its intended purposes.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a feed block press, a block mold assembly comprising, stationary means, door means pivotally connected to said stationary means and operative upon closing thereof to form a flat sided block mold, block die means connected to said door means to define at least one flat-sided face of a block formed in the block mold, said die means including chamfer forming means operative to engage an edge of said one flat-sided face in response to opening of said door means to spin the block away from the mold.

2. The mold as defined in claim 1, wherein said stationary means includes stationary die means forming at least a second flat-sided face of said block with a fulcrum edge engageable by the stationary die means as the block is spun away from the mold.

3. The mold as defined in claim 1, including adjustable pressure lock means operatively connected to said stationary means and operative to engage and hold said door means in closed position and selective release means operatively connected to said lock means to selectively disengage said lock means from said door means.

4. The mold as defined in claim 1, wherein said stationary means includes stationary die means forming a second face of said block and including a corner forming surface engageable by an edge of said second face as the block is spun away from the mold, adjustable pressure lock means operatively connected to said stationary means and operative to engage and hold said door means in closed position and selective release means operatively connected to said lock means to selectively disengage said lock means from said door means.

5. A block mold comprising, relatively movable die means including block side forming surfaces, power means operatively connected to said die means to close said die means to form a block mold and open said die means for removal of a block, flat chamfer face forming means connected to said side forming surfaces operative in response to opening of the die means to engage edges of some of the chamfer faces on the block to spin the block away from the side forming surfaces for removal thereof.

6. A block mold as defined in claim 5 wherein said die means comprises a stationary portion and a door portion pivotally connected thereto, both of said portions including block side forming surfaces and flat chamfer face forming means.

7. A block mold as defined in claim 6, including selectively releasable, adjustable pressure lock means operatively connected to said stationary portion and engageable with said door portion.

8. The combination of claim 1, including adjustable wear compensating pressure lock means operatively connected to the stationary means and door means for movement to a predetermined locking position applying a predetermined holding pressure on the door means, and selective release means operatively connected to the stationary means for limiting movement of the pressure lock means to said predetermined locking position and engageable with the lock means for release thereof from the locking position.

9. The combination of claim 8 wherein said pressure lock means includes cradle means mounted on the door means, arm means engageable within the cradle means and lock lever means pivotally mounted on the stationary means for displaceably connecting the arm means to the stationary means.

10. The combination of claim 9, wherein the pressure lock means further includes wear compensating shims disposed between the door means and cradle means mounted thereon.

11. A mold assembly for forming a flat sided block having spaced edges comprising, a pair of relatively movable die members having flat side forming surfaces, pressure locking control means operatively interconnecting said die members for releasably securing said die members in a casting position, die opening means operatively interconnecting said die members for movement between said casting position and an open position and control surface means formed on the flat side forming surfaces of said die members for frictional sliding engagement with the spaced edges on the flat sided block in response to relative movement of said die members toward the open position to pivotally displace said block with respect to said die members for ejection from the mold assembly.

12. The combination of claim 11, wherein the control surface means includes chamfer forming faces on said die members, one of said chamfer forming faces forming a fulcrum with one of said spaced edges of the block, the other chamfer forming face being engageable with the other of said spaced edges for displacement of the block.

13. The combination of claim 12, wherein said pressure locking control means comprises, locking means movably mounted on one of said members for selective displacement into locking engagement with the other member when in a casting position, locking pressure means mounted on said one member and responsive to movement thereof in a pressure applying direction to engage the locking means with the other member with increasing pressure and pressure regulating release means operatively mounted on said one member for limiting movement of said locking pressure means to a predetermined pressure applying position and operative to selectively displace the locking pressure means in a pressure releasing direction so as to render the die opening means operative to displace the other die member to an open position with respect to said one die member.

14. The combination of claim 11, wherein said pressure locking control means comprises, locking means movably mounted on one of said members for selective displacement into locking engagement with the other member when in a casting position, locking pressure means mounted on said one member and responsive to movement thereof in a pressure applying direction to engage the locking means with the other member with increasing pressure and pressure regulating release means operatively mounted on said one member for limiting movement of said locking pressure means to a predetermined pressure applying position and operative to selectively displace the locking pressure means in a pressure releasing direction so as to render the die opening means operative to displace the other die member to an open position with respect to said one die member.

15. A pressure locking control mechanism for two mold-forming members movable relative to each other between a closed and open position comprising, locking means movably mounted on one of said members for selective displacement into locking engagement with the other member when in a closed position, locking pressure means mounted on said one member and responsive to movement thereof in a pressure applying direction to engage the locking means with the other member with increasing pressure and pressure regulating release means operatively mounted on said one member for limiting movement of said locking pressure means to a predetermined pressure applying position and operative to selectively displace the locking pressure means in a pressure releasing direction.

References Cited in the file of this patent

UNITED STATES PATENTS

| | | |
|---|---|---|
| 387,516 | Hoop et al. | Aug. 7, 1888 |
| 461,157 | Brickley | Oct. 13, 1891 |
| 586,414 | Betty | July 13, 1897 |
| 703,688 | West | July 1, 1902 |
| 737,521 | Stopple | Aug. 25, 1903 |
| 1,235,094 | Barker | July 31, 1917 |
| 1,245,617 | Prinzler | Nov. 6, 1917 |
| 1,696,652 | Smith | Dec. 25, 1928 |
| 2,450,482 | Morin | Oct. 5, 1948 |
| 2,503,354 | Quinn | Apr. 11, 1950 |
| 2,834,504 | Annicq | May 13, 1958 |
| 2,836,873 | Lingl | June 3, 1958 |

FOREIGN PATENTS

| | | |
|---|---|---|
| 192,928 | Germany | Nov. 28, 1907 |